(12) United States Patent
Boman et al.

(10) Patent No.: US 6,980,773 B2
(45) Date of Patent: Dec. 27, 2005

(54) APPARATUS AND METHOD FOR BIAS COMPENSATION IN LINE CIRCUITS

(75) Inventors: Jan Ingvar Boman, Spanga (SE); Adam Hassan Pirzada, Sundbyberg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 843 days.

(21) Appl. No.: 09/907,452

(22) Filed: Jul. 18, 2001

(65) Prior Publication Data

US 2003/0017807 A1    Jan. 23, 2003

(51) Int. Cl.[7] .................................. H04B 1/38
(52) U.S. Cl. ..................... 455/73; 326/33; 326/82
(58) Field of Search ..................... 455/73; 326/33, 326/82

(56) References Cited

U.S. PATENT DOCUMENTS

| | | | |
|---|---|---|---|
| 3,825,682 A | 7/1974 | Phillips | 178/69 G |
| 5,703,532 A * | 12/1997 | Shin et al. | 330/253 |
| 5,872,471 A * | 2/1999 | Ishibashi et al. | 327/98 |
| 6,034,551 A | 3/2000 | Bridgewater, Jr. | 326/82 |
| 6,124,727 A | 9/2000 | Bridgewater, Jr. et al. | 326/33 |

FOREIGN PATENT DOCUMENTS

WO    84/00862    3/1984

OTHER PUBLICATIONS

International Preliminary Examination Report PCT/SE02/01326.
National Semiconductor, "LVDS Owner's Manual," Apr. 1, 2000, pp. 23-43, Chapter 4, Designing with LVDS, www.national.com/appinfo/lvds/.

* cited by examiner

Primary Examiner—Ahmad F. Matar
Assistant Examiner—Quynh H. Nguyen
(74) Attorney, Agent, or Firm—Nixon & Vanderhye P.C.

(57) ABSTRACT

A transmission line circuit includes a line driver having first and second outputs coupled through a differential transmission line to first and second inputs of a line receiver. A first bias is provided between the first and second inputs of the line receiver. The second bias is applied between the first and second outputs of the line driver. As a result, the first and second biases substantially offset, and preferably cancel, each other. If the differential transmission line is not coupled to a line driver, the second bias associated with that line driver is not applied permitting the first bias to provide a relatively high noise margin.

24 Claims, 4 Drawing Sheets

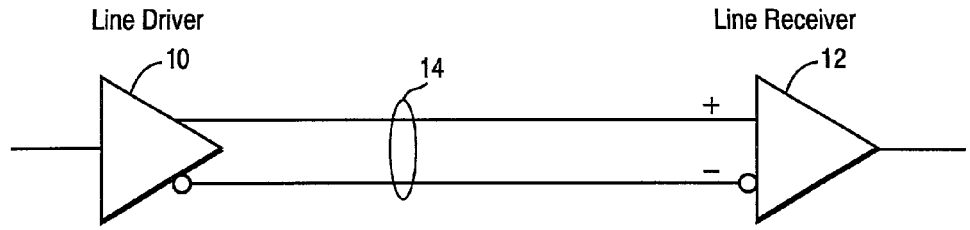
*Fig. 1*
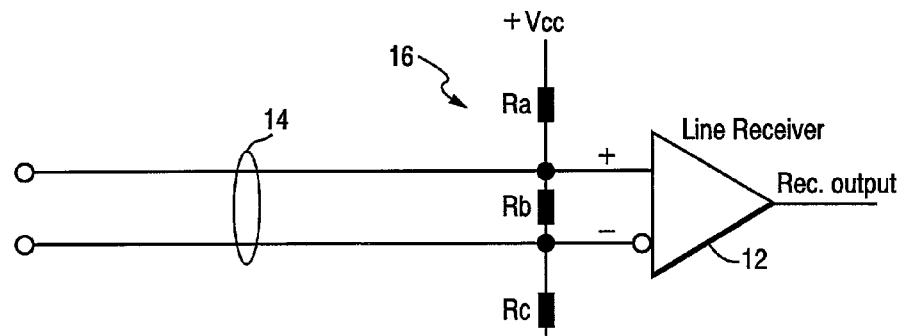
*Fig. 2*
Open Line Without Bias  Open Line With Bias
Line Receiver inputs
—— ( + ) input
········· ( − ) input
  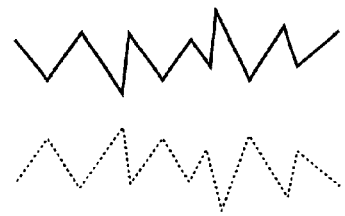
Line Receiver output
  (Always high level)
*Fig. 3A*   *Fig. 3B*

APPARATUS AND METHOD FOR BIAS COMPENSATION IN LINE CIRCUITS

FIELD OF THE INVENTION

The present invention relates to line driver-line receiver circuits, and in particular, to bias compensation in such line circuits.

BACKGROUND AND SUMMARY OF THE INVENTION

Line driver-line receiver circuits are used for example in digital or pulse communications and typically employ a differential transmission line to couple differential, i.e., positive and negative, outputs of a line driver (sometimes called a line transmitter) and corresponding differential inputs of the line receiver. Noise can often be a problem in such configurations. For example, if all differential transmission pairs bundled in a cable are not coupled, signals from the open or unterminated line drivers can adversely impact the desired signaling on another differential transmission pair in the cable, especially on the open line receivers. Such an open transmission line can act as an antenna, picking up noise from adjacent transmission line pairs in the cable and elsewhere, and delivering that noise to the open line receivers. This noise can be detected as invalid data.

The present invention overcomes this and other types of noise detection using bias circuitry. First bias circuitry is coupled across the first and second inputs of a line receiver. This first bias circuitry provides sufficient bias to protect the line receiver from being affected by incoming noise, e.g., noise resulting from a line driver not being coupled to the transmission line. However, when the line driver is coupled to the transmission line, second bias circuitry is engaged to compensate for undesirable effects on data signals received in the first and second inputs of the line receiver caused by the first bias circuit, e.g., asymmetric data waveforms. Thus, the first and second bias circuitry offset one another, and preferably, cancel out the effect of the other.

In a specific, non-limiting example embodiment, the first bias circuitry includes a first resistor coupled to a first voltage and to a first input of the line receiver, and a second resistor coupled to a second input of the line receiver and to ground. The second bias circuitry includes a third resistor coupled between a second voltage and a second output of the line driver, and a fourth resistor coupled between the first output of the line driver and ground. The first and third resistors have substantially the same value. The second and fourth resistors have substantially the same value. The first and second voltages are substantially the same.

An example method in accordance with the present invention may be used in conjunction with a line driver having first and second outputs coupled through a differential transmission line to first and second inputs of a line receiver. A first bias is provided between the first and second inputs of the line receiver. A second bias is applied between the first and second outputs of the line driver. As a result, the first and second biases substantially offset, and preferably, cancel each other. If the differential transmission line is not coupled to a line driver, the second bias associated with that line driver is not applied permitting the first bias to provide a relatively high noise margin. This high noise margin is advantageous, for example, when the differential transmission line is one of plural differential transmission lines coupled to plural line receivers.

A non-limiting, example application of the present invention is in a radio base station. The base station includes a first unit that is configured to receive multiple transceiver units and is coupled to a cable that contains multiple corresponding differential transmission lines. Each transceiver unit includes a line driver coupled to one of the differential transmission lines. Each transceiver unit is associated with a bias circuit configured to apply a bias voltage across the first and second outputs of its associated line driver. The base station also includes a switch unit coupled to the cable which includes plural line receivers. Each line receiver includes first and second inputs coupled to one of the differential transmission lines in the cable. Each line receiver also includes another bias circuit that is configured to apply another bias across the first and second inputs. The line driver of each transceiver unit is coupled by one of the differential transmission lines to one of the line receivers. The bias circuit associated with the line driver compensates for the bias circuit associated with the line receiver. The bias circuit associated with the line receiver provides sufficient bias to protect the line receiver from incoming noise if a line driver is not coupled to the other end of the differential transmission line.

The present invention provides a number of advantages. First, and perhaps most significant, because a relatively high bias voltage can be applied across the inputs of the line receiver, a fairly high level of noise can be tolerated on the differential transmission lines without any transfer of invalid data from an open transmission line. Second, the high bias provided by the first bias circuit does not negatively impact the normal operation of the line circuit when a line driver is attached and transmitting data. As explained below, asymmetries in the data waveforms received on the positive and negative inputs of the line receiver are effectively eliminated by the second biasing circuit which offsets the bias provided by the first bias circuit. Third, the present invention is easy to implement with just a few simple resistors. Fourth, the invention is cost effective because there is no need to use shielded cables, transmission lines, and connectors that would otherwise be needed to avoid picking up noise and other distortion on open-ended transmission lines.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not to scale, emphasis instead being placed upon illustrating the principles of the invention.

FIG. 1 shows an example transmission line circuit with a line driver coupled to a line circuit over a differential transmission line, which is terminated with a resistor (not shown) equal to the line impedance;

FIG. 2 illustrates an open-ended transmission line circuit in which a line driver is not coupled to the differential transmission line with a bias circuit;

FIGS. 3A and 3B illustrate unbiased and biased voltage levels of the line receiver differential inputs (+) and (−);

DETAILED DESCRIPTION

Figure 4:
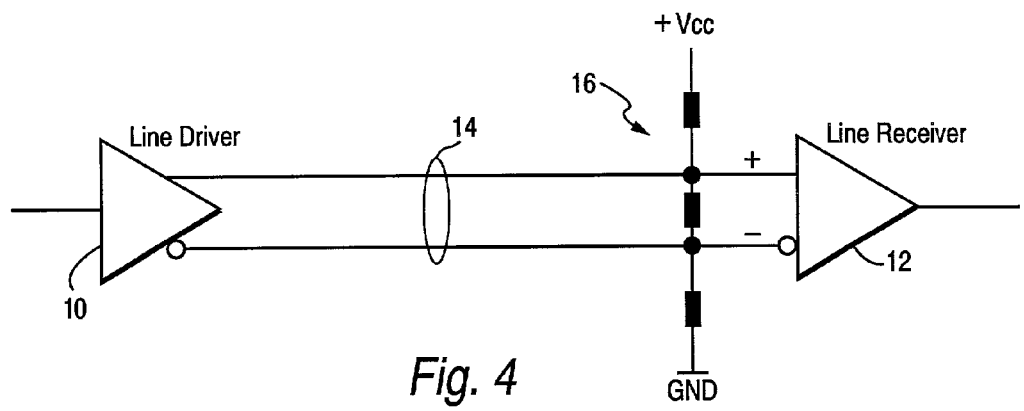
FIG. 4 illustrates a line driver with a bias circuit applied across the inputs of the line receiver with the line driver coupled to the differential pair.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuitry, using software functioning in conjunction with a suitably programmed digital microprocessor or general purpose computer, using an Application Specific Integrated Circuit (ASIC), and/or using one or more Digital Signal Processors (DSPs).

FIG. 1 illustrates a transmission line circuit including a line driver 10 having a differential output coupled to a differential transmission line 14. At its other end, the differential transmission line 14 is coupled and terminated at the positive and negative terminals of a line receiver 12. The line receiver 12 produces an output signal that is a function of the difference between the positive (+) and negative (−) inputs. When the (+) input is lower than the (−) input, the output signal is zero. When the (+) input is higher than the (−) input, the output signal is "1". Differential signals are typically used to convey information rather than the information signal itself, because the differencing removes unwanted distortions, offsets, or other undesired components that may adversely affect the information signal itself during transmission.

FIG. 2 illustrates an open line circuit that includes the line receiver 12 coupled to the differential transmission line 14 with no line driver 10 coupled at the other end. Such an open transmission line acts as an antenna and picks up noise. In some transmission environments, multiple differential transmission lines are included in a cable, and only some may be actively used. Signals in an active transmission line may be readily picked up as noise in an open transmission line and provided to the line receiver which treats this noise as actual data. One way to resolve this problem is to provide a first bias voltage between the positive and negative inputs of the line receiver. FIG. 2 illustrates an example first bias circuit that can provide such a first bias differential. A voltage $V_{cc}$ is coupled in a voltage divider through a first resistor Ra to the positive input terminal, through a resistor Rb connected to the negative input terminal, and then through a resistor Rc to ground. The resistor Rb is a line termination resistance which is not part of the invention. Typically, such terminating resistors are used to match the characteristic impedance of the line to avoid reflections of transmitted signals. Non-limiting example circuit values are $V_{cc}$=3.3 volts, Ra=1800 Ω, Rb=100 Ω and Rc=1000 Ω.

FIGS. 3A and 3B illustrate unbiased and biased voltage levels of the line receiver differential inputs (+) and (−). FIG. 3A shows that the (+) and (−) input levels cross each other, and FIG. 3B shows that the (+) and (−) levels do not cross each other. More specifically, FIG. 3A graphically illustrates an open line circuit without a bias being applied between the positive and negative inputs of the line receiver. The noise signal has a magnitude within the range or even exceeding the range of the steady state difference between the positive and negative inputs of the line receiver 12. This results in "false" detections of data at the line receiver output caused by noise rather than actually received data. FIG. 3B illustrates a similar noise waveform having virtually no impact on the line receiver output, (i.e., the line receiver output is always at a high level), when the DC bias voltage between the positive and negative inputs is sufficiently large to exceed the magnitude of the noise. In essence, the first bias circuit prevents a false detection at the output of the line receiver, i.e., a change in sign byway of comparison between the positive and negative signals caused by noise spikes, at the output terminal. Thus, it is desirable to have the magnitude of the DC voltage large enough to exceed that of the typical noise signals on the line.

Figure 5:
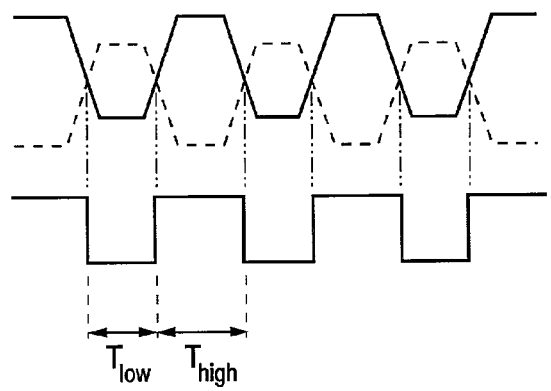
FIG. 5 illustrates a waveform of the data on the plus and minus input terminals of the line receiver with the bias circuit shown in FIG. 4.

However, when a line driver 10 is coupled to the open end of the transmission line 14, as shown in FIG. 4, the biasing circuit 16 negatively impacts the differential data being transmitted by the line driver 10 over the differential transmission line 14 to the line receiver. In general, if the DC levels of the first and second inputs of the line receiver are not equal, time distortion is a problem. The load capacitance of the transmission cable has a bandwidth limiting affect that causes the differential waveform edges to have an angled slope instead of being true square waves. As shown in FIG. 5, the first bias circuit 16 causes an asymmetry in the positive signal waveform relative to the negative terminal waveform received at the line receiver 12. In the time interval $T_{low}$, the differential input waveform magnitudes are smaller, and the time period is shorter than for the next time period $T_{high}$. This affects the zero crossing at the line receiver causing the asymmetry shown in FIG. 5. The asymmetry becomes increasingly more problematic the greater the bias voltage applied between the positive and negative input terminals of the line receiver by the first bias circuit 16. Although it might be desirable to minimize the amount of bias voltage applied, as the bias voltage decreases, the chance of noise registering an erroneous output at the line receiver increases.

Figure 6:
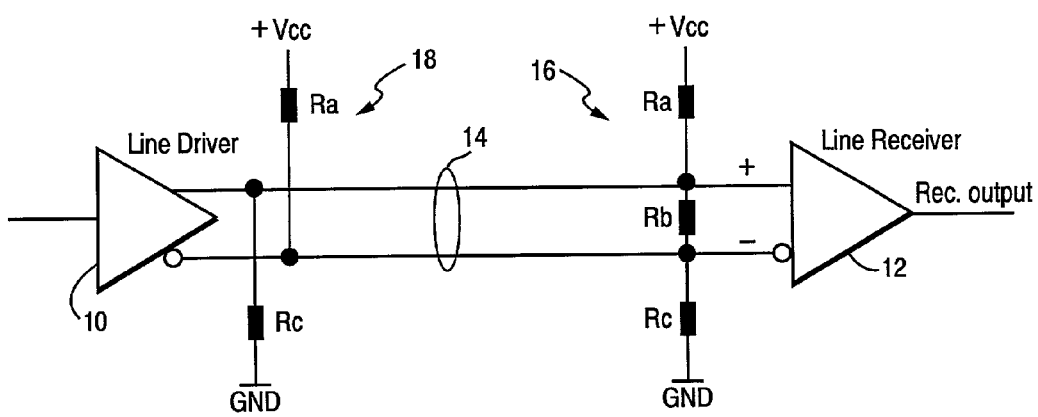
FIG. 6 illustrates a line circuit with two bias circuits.

The present invention resolves this issue by employing a second bias circuit 18, as shown in FIG. 6, when the line driver 10 is coupled to the differential transmission line 14. The second bias circuit 18 complements the effect of the first bias circuit 16 when a line driver is coupled to the differential transmission line. While offsetting one bias by the other may be sufficient, it is preferable to substantially cancel adverse biasing effects.

Figure 7:
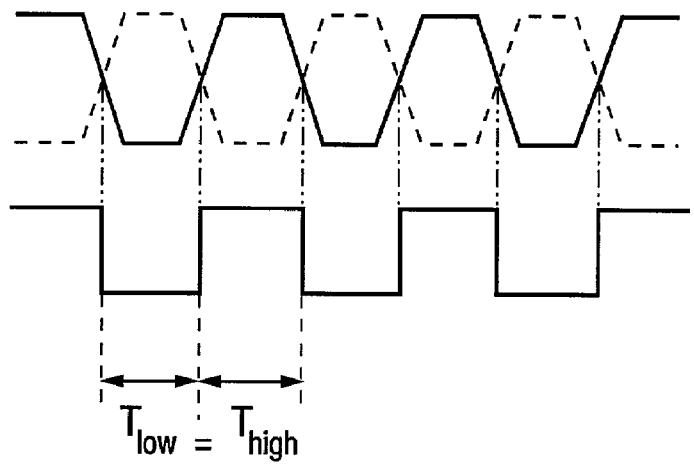
FIG. 7 is a waveform illustrating the data signals at the positive and negative terminals of the line receiver in the line circuit shown in FIG. 6.

As shown in this example implementation, the same voltage source $V_{cc}$ is coupled to the negative differential output of the line driver through resistor Ra, and ground is coupled through resistor Rc to the positive differential output of the line driver 10. As a result of connecting resistors Ra and Rc in the second bias circuit 18 to the opposite differential lines relative to the line receiver, the voltage level at the positive and negative input terminals of the line receiver will be substantially equal, i.e., there will be little or no DC bias, assuming the resistors are equally matched. The second biasing circuit eliminates the asymmetry between the positive and negative waveforms as shown in FIG. 7.

Figure 8:
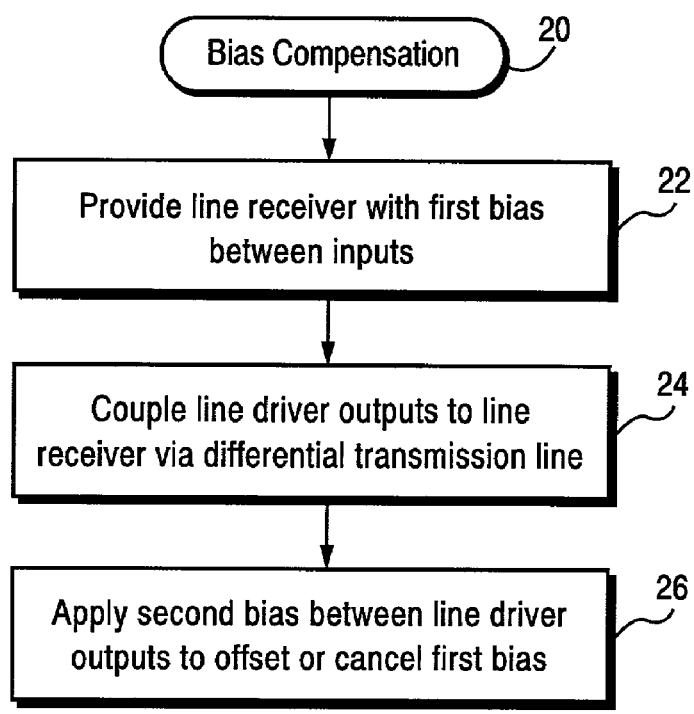
FIG. 8 is a bias compensation routine setting forth procedures in accordance with one example embodiment of the present invention.

FIG. 8 illustrates a bias compensation methodology (block 20) in accordance with one example, non-limiting embodiment of the present invention. A line receiver is provided with the first bias between its differential inputs (block 22). A line driver's differential outputs are coupled to the line receiver inputs via a differential transmission line (block 24). When the line driver is coupled to the transmission line, a second bias is applied between the line driver outputs to offset or cancel the first bias (block 26). The first and second biases may be applied in any fashion. The bias circuits 16 and 18 shown in FIG. 6 are merely examples.

Figure 9:
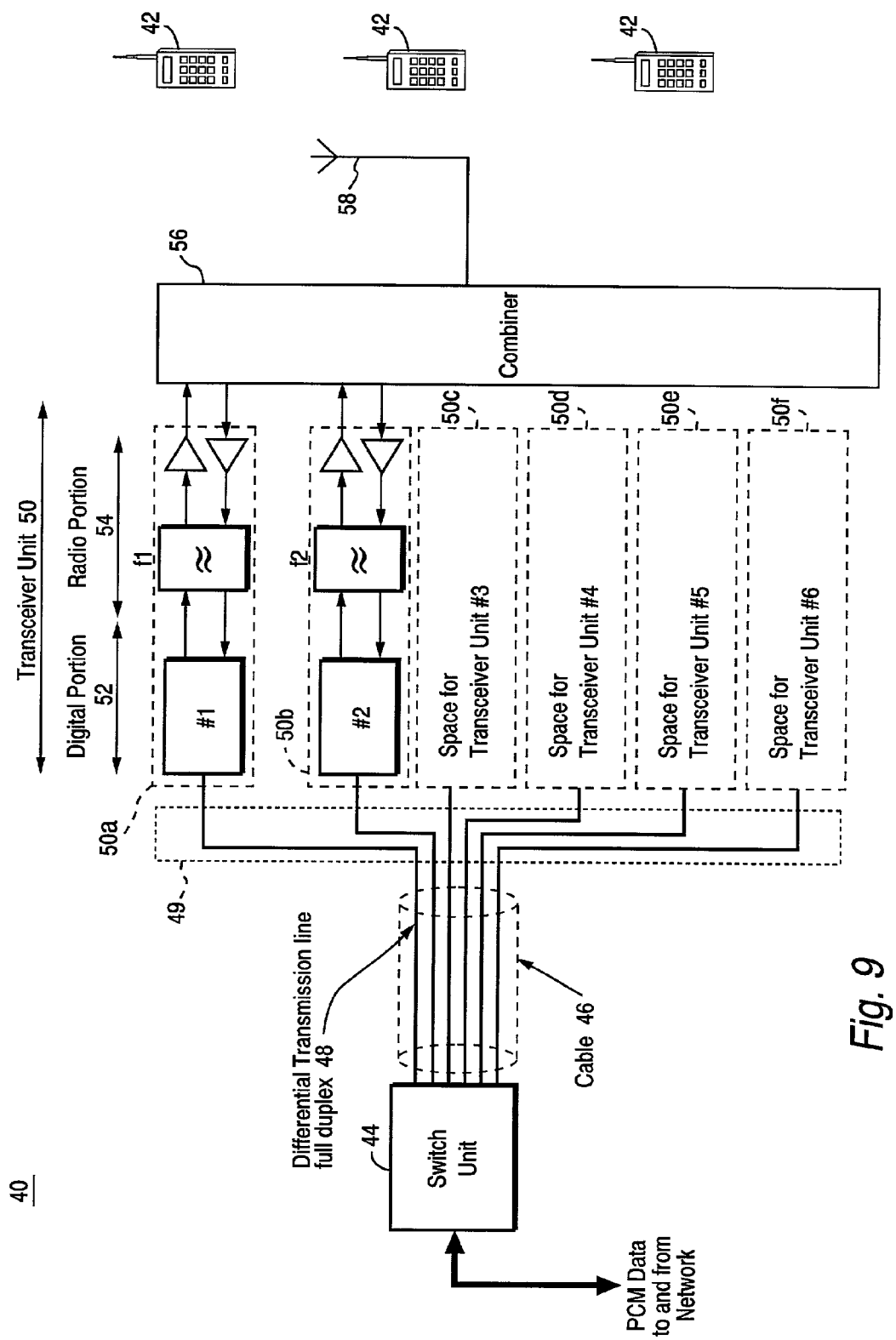
FIG. 9 is a block diagram of a base station in which the present invention is may be advantageously employed.

One non-limiting, example, and advantageous application of the present invention may be found in radio base stations. FIG. 9 is a simplified block diagram of a base station 40 that communicates over a radio interface with mobile radio stations 42. The base station includes a switch unit 44 which transceives pulse coded modulation (PCM) data to and from another network, e.g., a radio access network. The switch unit 44 is also coupled to a cable 46 which includes multiple differential transmission lines 48. Each differential transmission line is coupled to a back plane 49 to one of six connectors which can receive one of six multiple transceiver units 50a–50f. Each transceiver unit 50 may be received or inserted to an appropriate connector in the back plane 49, and includes a digital portion 52 and a radio portion 54. Each received transceiver unit 50 is also coupled to a combiner 56 which combines the signals for transmission by antenna 58. Each transceiver board in this non-limiting example can handle eight calls or connections. If all six transceiver units are received in the back plane 49, a total of forty-eight calls or connections can be serviced by the base station. The switch unit 44 coordinates the timing of transport of the data for these forty-eight calls and converts the data to/from PCM format and receives/distributes the PCM data from/to the appropriate differential transmission lines and corresponding transceiver unit.

As shown in FIG. 9, not all base stations always utilize their maximum capacity, i.e., some smaller number of transceiver units are coupled to the back plane 49. In this example, only two transceiver units 50a and 50b are received in the back plane 49. The remaining differential transmission lines corresponding to potential transceiver units 50c–50f are open. The switch unit 44 has a line receiver 12 and first bias circuit 16 for each differential transmission line. Each digital portion 52 of the two received transceiver units 50a and 50b includes a line driver 10 and an associated second bias circuit 18. Thus, for the received transceiver units 50a and 50b, the first and second bias circuits offset each other so that there is preferably little or no asymmetry in the waveforms received at the corresponding line receiver input terminals. For open differential transmission lines provided for potential transceiver units 50c–50f, there is no line driver 10 or associated second bias circuit 18. The first bias circuit 16 associated with the line receiver 12 for each differential transmission line can be configured to produce a relatively high bias voltage between the input terminals of the line receiver 12 thereby providing a high noise margin.

As mentioned above, the present invention is simple, easily implemented, and inexpensive. Moreover, there is no need to use shielded cables and connectors which would add expense and size. Nor does there need to be any special compensation taken in the line receivers to compensate for: (1) noise, distortion, and invalid data caused by open transmission lines, or (2) asymmetries in received data signals on positive and negative terminals when a line driver is connected to the differential transmission line.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Although the present invention is described in relation to preferred example embodiments, it is to be understood that this disclosure is only illustrative and exemplary of the present invention. The scope of the invention is defined by the appended claims.

What is claimed:

1. Apparatus comprising:
   a line receiver having first and second inputs;
   a transmission line coupled to first and second inputs of the line receiver;
   a first bias circuit coupled across the first and second inputs;
   a line driver having first and second outputs capable of being coupled to the first and second inputs of the line receiver, respectively;
   a second bias circuit coupled across the first and second outputs of the line driver,
   wherein the first bias circuit includes a first resistor coupled to a first voltage and the first input and a second resistor coupled to the second input and ground, and the second bias circuit includes a third resistor coupled between a second voltage and the second output and a fourth resistor coupled between the first output and ground, and
   wherein a bias of second bias circuit is configured to substantially offset or cancel a bias of the first bias circuit.

2. The apparatus in claim 1, wherein the first and second bias circuits are complementary.

3. The apparatus in claim 1, wherein the first bias circuit is configured to provide sufficient bias to protect the line receiver from incoming noise.

4. The apparatus in claim 3, wherein the incoming noise is received by the line receiver being coupled to an open the transmission line.

5. The apparatus in claim 1, wherein the second bias circuit is configured to compensate for asymmetric data signals received on the first and second inputs caused by the first bias circuit.

6. The apparatus in claim 1, wherein the first and third resistors have substantially the same value, the second and fourth resistors have substantially the same value, and the first and second voltages are substantially the same.

7. The apparatus in claim 1, wherein the transmission line is a differential transmission line.

8. A method for use with a line receiver having first and second inputs coupled to a differential transmission line where a first bias is provided between the first and second inputs, comprising:
   coupling a line driver having first and second outputs to the first and second inputs via the differential transmission line, and applying a second bias between the first and second outputs of the line driver,
   wherein the first bias includes a first resistor coupled to a first voltage and the first input and a second resistor coupled to the second input and ground, and the second bias includes a third resistor coupled between a second voltage and the second output and a fourth resistor coupled between the first output and ground, and wherein the first bias and the second bias substantially offset or cancel.

9. The method in claim 8, wherein the first bias and the second bias are substantially complementary.

10. The method in claim 8, wherein the differential transmission line is one of plural differential transmission lines coupled to the line receiver, and wherein if one of the differential transmission lines is not coupled to a line driver, the second bias associated with that line driver is not applied.

11. The method in claim 8, further comprising: if the line driver is decoupled from the differential transmission line, removing the second bias.

12. Apparatus comprising:
a line receiver having an input and being associated with first circuitry to compensate for noise that may be present at the input;
a line driver having an output capable of being coupled to the input of the line receiver; and
second circuitry configured to be coupled to the output when the line driver is coupled to the input of the line receiver for compensating for an effect of the first circuitry,
wherein the first circuitry is a first bias circuit providing a first DC bias voltage and the second circuitry is a second bias circuit providing a second DC bias voltage to offset the first DC bias voltage, and
wherein the first bias circuit includes a first resistor coupled to a first voltage and the first input and a second resistor coupled to the second input and ground and the second bias circuit includes a third resistor coupled between a second voltage and the second output and a fourth resistor coupled between the first output and ground.

13. The apparatus claim 12, wherein the first and third resistors have substantially the same value, the second and fourth resistors have substantially the same value, and the first and second voltages are substantially the same.

14. Apparatus for use in a radio base station, comprising:
a first unit coupled to a cable containing multiple differential transmission lines and configured to receive multiple line receivers, each line receiver including first and second inputs coupled to one of the differential transmission lines and a first bias circuit configured to apply a first bias across the first and second inputs of the line receiver, and
a second unit configured to receive multiple transceiver units and coupled to the cable, each transceiver unit including a line driver coupled to one of the differential transmission lines, each transceiver unit being associated with a second bias circuit configured to apply a second bias across the first and second outputs of the line drivers,
wherein the line driver of each transceiver unit is coupled by one of the differential transmission lines to one of the line receivers, wherein the second bias circuit associated with the line driver compensates for the first bias circuit associated with the one line receiver, and wherein the first bias circuit includes a first resistor coupled to a first voltage and the first input and a second resistor coupled to the second input and ground, and the second bias circuit includes a third resistor coupled between a second voltage and the second output and a fourth resistor coupled between the first output and ground.

15. The apparatus in claim 14, wherein a second bias across the one differential transmission line provided by the second bias circuit associated with the line driver substantially offsets a first bias provided by the first bias circuit associated with the one line receiver.

16. The apparatus in claim 14, wherein a second bias across the one differential transmission line provided by the second bias circuit associated with the line driver substantially cancels a first bias provided by the first bias circuit associated with the one line receiver.

17. The apparatus in claim 14, wherein the first bias circuit is configured to provide sufficient bias to protect the line receiver from incoming noise if the one line driver is not coupled to the one differential transmission line.

18. The apparatus in claim 14, wherein the second bias circuit is configured to compensate for an asymmetry on incoming data signals received on the first and second inputs caused by the first bias circuit.

19. The apparatus claim 14, wherein the first and third resistors have substantially the same value, the second and fourth resistors have substantially the same value, and the first and second voltages are substantially the same.

20. The apparatus in claim 14, wherein for one of the differential transmission lines not coupled to a transceiver unit, the first bias circuit for the line receiver coupled to the one differential transmission line provides a DC bias circuit between the inputs of the line receiver to protect the line receiver from noise.

21. The apparatus in claim 1, wherein the first bias circuit includes only the first and second resistors, and the second bias circuit includes only the third and fourth resistors.

22. The method as in claim 8, wherein the first bias includes only the first and second resistors, and the second bias includes only the third and fourth resistors.

23. The apparatus in claim 12, wherein the first bias circuit includes only the first and second resistors, and the second bias circuit includes only the third and fourth resistors.

24. The apparatus in claim 14, wherein the first bias circuit includes only the first and second resistors, and the second bias circuit includes only the third and fourth resistors.

* * * * *